United States Patent [19]

Reitmeier

[11] 4,377,820
[45] Mar. 22, 1983

[54] ADAPTIVE ERROR CONCEALMENT

[75] Inventor: Glenn A. Reitmeier, Trenton, N.J.

[73] Assignee: RCA Corporation, New York, N.Y.

[21] Appl. No.: 259,361

[22] Filed: Apr. 30, 1981

[51] Int. Cl.³ .......................... H04N 9/535; H04N 5/76
[52] U.S. Cl. .................................. 358/21 R; 358/163;
    358/314; 371/65
[58] Field of Search ............... 358/314, 315, 316, 327,
    358/21 R, 163, 77; 360/38; 371/31, 65

[56] References Cited

U.S. PATENT DOCUMENTS

| | | | |
|---|---|---|---|
| 4,122,489 | 10/1978 | Bolger et al. .................. | 358/314 X |
| 4,163,249 | 7/1979 | Michael et al. .................. | 358/21 R |
| 4,315,278 | 2/1982 | Pasdera .......................... | 358/327 X |

FOREIGN PATENT DOCUMENTS

| | | | |
|---|---|---|---|
| 2070884 | 9/1981 | United Kingdom ................ | 358/314 |
| 2073534 | 10/1981 | United Kingdom ................ | 358/327 |

Primary Examiner—Bernard Konick
Assistant Examiner—Donald McElheny, Jr.
Attorney, Agent, or Firm—E. M. Whitacre; W. H. Meise; H. I. Steckler

[57] ABSTRACT

Method and apparatus for replacing defective video information in a video signal line comprises sampling the video signal. Video information from the preceding in-phase pixel and the subsequent in-phase pixel are averaged to form a replacement pixel. Weighting coefficients are generated based upon the amplitude difference between the next adjacent and semi-adjacent pixels having the same subcarrier phase. These weighting coefficients are used to determine the amount of information contribution of the previous and subsequent pixels to arrive at the closest video approximation of the defective pixel. Three times color subcarrier frequency sampling is preferred.

8 Claims, 3 Drawing Figures

ADAPTIVE ERROR CONCEALMENT

BACKGROUND OF THE INVENTION

The present invention relates to adaptive error concealment, and more particularly, to such concealment for use with digital television tape recording.

When reproducing recorded sample signals, a loss of signal ("dropout") sometimes occurs due to scratches or other imperfections on the surface of the magnetic tape, etc. These dropouts are usually of sufficient duration to cause the loss of many recorded samples, thus producing a burst error. To conceal such dropouts, it is known to use time spreading schemes such as shown in U.S. patent application Ser. No. 139,237 filed Apr. 11, 1980, in the names of J. K. Clemens and N. R. Corby, Jr. and U.S. patent application Ser. No. 170,811 filed July 21, 1980 in the name of G. A. Reitmeier. In these schemes, adjacent samples of the original video signal are non-adjacently recorded on the tape by using multiple tracks and/or time delay elements. Upon reproduction, the original sample order is reobtained using further time delay elements. Thus when a dropout occurs, it affects samples that are adjacent on the tape, but non-adjacent in the reproduced video signal, i.e., it is "spread out", as shown in FIG. 1, wherein "X" and "O" represent dropped-out and good samples respectively. Since only one of every four samples is incorrect in these particular arrangements, the good samples surrounding an erroneous sample can be used to generate an estimate to replace the erroneous sample, thereby concealing the error.

The simplest method for error concealment is to simply average together the two closes samples to the sample in error which have identical subcarrier phase, which samples are shown in FIG. 2. Since with three times subcarrier frequency sampling, every third sample has the same subcarrier phase, the estimated value $\hat{f}(n)$ for a dropped-out sample $p(n)$ is:

$$\hat{f}n = \tfrac{1}{2}p(n-3),$$

where $p(n-3)$ is a sample taken three sample periods before sample n, and $p(n+3)$ is a sample taken three sample periods after sample n. This method may not correct perfectly in areas of color luminance transitions, since it causes smearing.

In the aforementioned Reitmeier application, an adaptive method of error concealment was described for a signal sampled at a rate of four times the subcarrier frequency. Because of the reduced data rate of three times subcarrier sampled video, it may be desirable to use this rate for digital tape recording in spite of the decreased horizontal resolution, particularly where portability and power considerations are important since the lower data rate causes less tape and power usage. The aforementioned Reitmeier approach to error concealment formed estimates of the sample in error from different spatial directions, e.g. horizontal and vertical, and adaptively chose one of the said estimates based on a criterion of minimum direction of change. In the case of a three times subcarrier frequency sampling, the resulting non-orthogonal sampling pattern makes the previous approach more difficult. In any case, the use of such an adaptive method requires the use of at least 2H (120 microseconds for NTSC) of digital delay, which is undesirable in those applications where portability, power consumption and cost are of utmost concern, and where a sampling rate of three times subcarrier frequency sampling might be used.

It is therefore an object of the present invention to provide improved error concealment for digital video signals, particularly signals sampled at three times the color subcarrier frequency which signals are thereafter recorded.

SUMMARY OF THE INVENTION

Method and apparatus for estimating a replacement sample for a lost sample of a sampled color television signal comprising computing the difference between the amplitudes of values of the two adjacent samples having the same color subcarrier phase as that of the lost sample and being to the right side of the lost sample upon display, computing the difference between the amplitudes or values of the two adjacent samples having the same color subcarrier phase as the lost sample and being to the left side of the lost sample upon display, computing left and right weighting coefficients respectively comprising the right and left differences divided by the sum of said left and right differences, multiplying said left and right coefficients by said nearest left and right adjacent samples respectively having the same subcarrier phase as the lost sample thereby resulting in two product signals, and forming an estimated replacement sample for the lost sample by adding said product signals.

DETAILED DESCRIPTION

Figure 1:
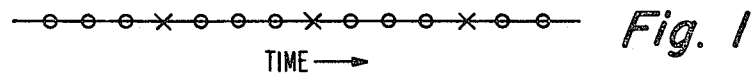
FIG. 1 shows an error pattern in one line of a reproduced sampled video signal.
Figure 2:
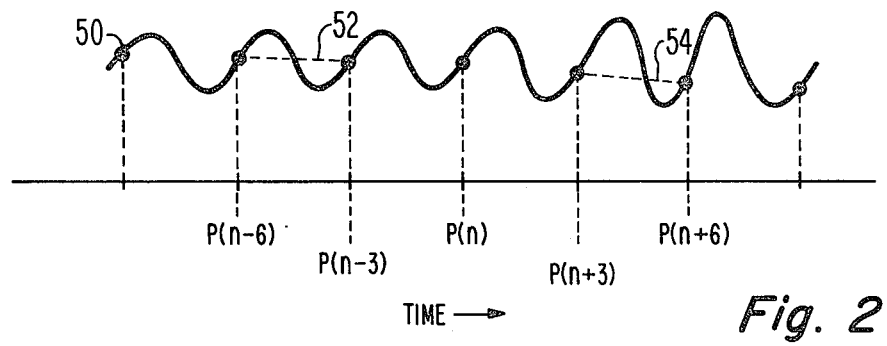
FIG. 2 shows an erroneous sample concealment scheme taking into account subcarrier phase.

In general, the present invention is an adaptive method of determining an estimate for use as a replacement for a dropout. FIG. 2 shows a video waveform 50 with changing phase and amplitude such as occurs at a typical color transition. If p(n) in FIG. 2 represents the dropped-out sample, then the third and sixth samples to the left, $p(n-3)$ and $p(n-6)$, are the nearest two in-phase samples to the left of p(n). The absolute value of the difference between the third sample to the left, $p(n-3)$, and the sixth sample to the left, $p(n-6)$ is computed. This difference is called $\Delta L$. The absolute value of the difference between the third sample to the right, $p(n+6)$, and the sixth sample to the right, $p(n+6)$ is computed. This difference is called $\Delta R$. Weighting coefficients $\alpha L = \Delta R/\Delta L + \Delta R$ and $\alpha R = 1 - \alpha L = \Delta L/\Delta L + \Delta R$ are then computed. It will be seen that a small difference between adjacent samples having the same color subcarrier phase from a particular side of the erroneous sample results in a large weighting coefficient and vice versa. Finally a sample estimate $\hat{f} = (\Delta L)p(n-3) + (\Delta R)p(n+3)$ is computed. Thus a greater contribution to the estimate is made by the nearest sample of the same subcarrier phase on the side in which the signal is changing the least, since the nearest inphase sample to the side of the dropped out sample for which the signal is changing the least is more likely to be a closer estimate for the dropped out sample than the nearest inphase sample to the side for which the signal is changing the most. However, some contribution to the estimate is desired from the sample to the side changing the most to provide for the situation when the dropped out sample occurs during a transition. Thus during a color transition, where the phase of the color subcarrier must change, using the above described weighted average to replace a dropped out sample maintains a smooth phase transistion in the color subcarrier. Thus in the situation depicted in FIG. 2 wherein the subcarrier is changing less rapidly to the left of p(n) than to the right side thereof as indicated by the slopes of lines 52 and 54 respectively, the replacement estimate for p(n) comprises a heavier weighting of the left sample $p(n-3)$ than of the right samples $p(n+3)$.

Figure 3:
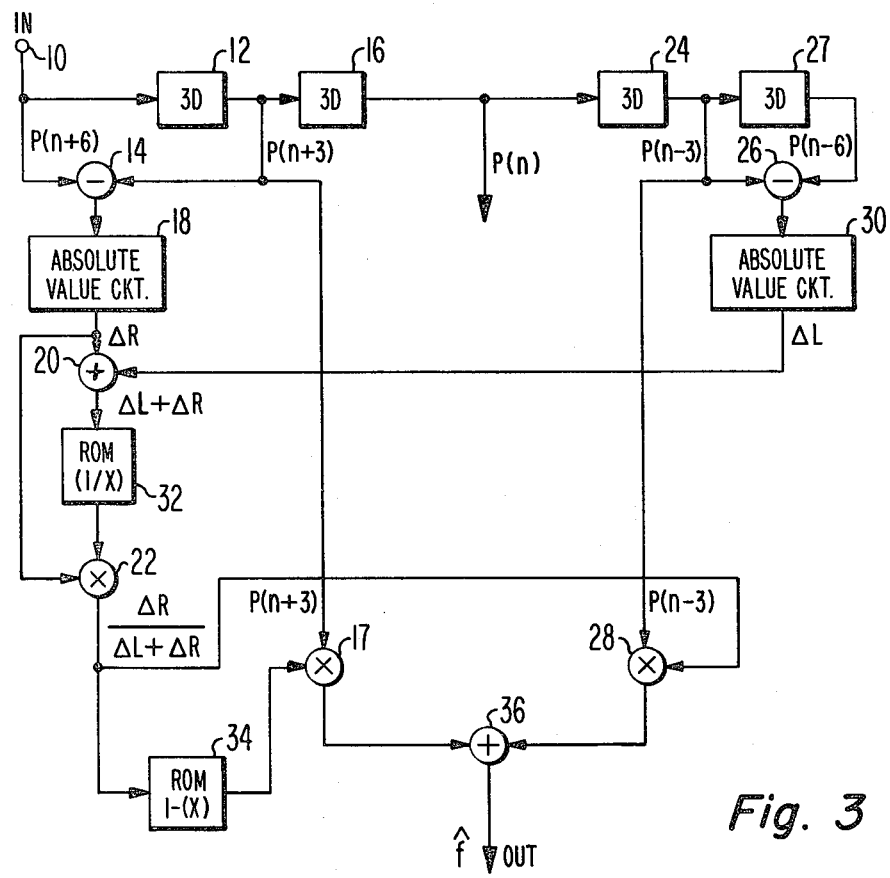
FIG. 3 shows a block diagram of a concealment circuit in accordance with the invention.

FIG. 3 shows a circuit for implementing the above described concept. Input terminal 10 receives a sampled video signal reproduced from a scanning magnetic head. The samples are in their original sequential order due to the use of, e.g., the reproducing apparatus of said prior applications. The samples can be in either analog or digital form. If digital, the most common digitizing method uses 8-bit quantization (256 grey levels). Therefore the various elements of the digital embodiment of the apparatus described below would be 8-bits "wide" or "deep" as is known, and 8-bit buses would be used for the interconnections shown. Whether sampled analog or digital, all elements of FIG. 3 would be clocked at the sample rate by a clock (not shown).

The arrangement of FIG. 3 generates from the video signal applied to terminal 10 a continuous stream of estimated sample values $\hat{f}$. The estimated value for a particular sample p(n) appears at the output terminal after a processing delay of 6D, where D is the duration of one sample period. In the case of three times subcarrier sampling of CCIR "M" type NTSC as used in the United States, D equals 93.3 nanoseconds.

When it is desired to provide an estimate for lost sample p(n), the input signal at terminal 10 represents a later-generated sample $p(n+6)$, which sample signal $p(n+6)$ is applied to a first input of subtractor 14 and to a delay line 12 having a delay time of 3D. The output signal from delay line 12 represents the sample $p(n+3)$ which is applied to 3D delay line 16, to multiplier 17, and to a second input subtractor 14. The output signal from subtractor 14 is the signal $p(n+3)-p(n+6)$ which is applied to an absolute-value circuit 18. The output of circuit 18 is therefore $|p(n+3)-p(n+6)|$, which equals the $\Delta R$ signal. The $\Delta R$ signal is applied to an input of adder 20 and to an input of multiplier 22.

The signal from delay line 16 is the sample p(n). By deriving this signal from the serially coupled delay lines 12 and 16 when there is no dropout as determined by a dropout detector (not shown), it is ensured that it will be in time synchronization with the estimate $\hat{f}$ produced by the circuit of FIG. 3.

The output signal from delay line 16 is applied to 3D delay line 24, whose output signal is the sample $p(n-3)$. This output signal is applied to subtractor 26 to 3D delay line 27, and to multiplier 28. The output signal from delay line 27 is the sample $p(n-6)$, which is applied to an input of a subtractor 26, and therefore the output signal from subtractor 26 is $p(n-6)-p(n-3)$. Absolute value circuit 30 provides the signal $|p(n-6)-p(n-3)|$, which signal equals the $\Delta L$ signal and is applied to adder 20. The output of adder 20 is therefore the signal $\Delta L + \Delta R$, which signal is applied as an address to ROM (read only memory) 32.

ROM 32 is programmed with signals which are the reciprocal of the address location and supplies at its output a signal that is the reciprocal of its input signal, and thus its output signal is $1/(\Delta L+\Delta R)$, which signal is applied to multiplier 22. Thus the output signal from multiplier 22 is $\Delta R/(\Delta L+\Delta R)=\alpha L$. This output signal is applied to multiplier 28 and as an address to ROM 34. ROM 34 is preprogrammed to provide an output signal that is one minus its input address signal, and thus the output signal from ROM 34 is $1-\Delta R/(\Delta L+\Delta R)=\Delta L/(\Delta L+\Delta R)=\alpha R$. The signal $\alpha R$ is applied to multiplier 17.

The output product signal from multiplier 28 is $(\alpha L)p(n-3)$, while the output product signal from multiplier 17 is $(\alpha R)p(n+3)$. The product signals are added together by adder 36 to form the estimated replacement signal $\hat{f}$ at the output of adder 36.

What is claimed is:

1. A method for estimating a replacement sample for a selected sample of a sampled color television signal, said method comprising computing the amplitude difference between two adjacent samples having the same color subcarrier phase as the selected sample and being to the right side of the selected sample upon display, computing the difference between the amplitude of two adjacent samples having the same color subcarrier phase as the selected sample and being to the left side of the selected sample upon display, computing left and right weighting coefficients respectively comprising the right and left differences divided by the sum of said left and right differences, multiplying said left and right coefficients by said nearest left and right adjacent samples respectively having the same subcarrier phase as the selected sample, thereby resulting in two product signals, and forming an estimated replacement sample for the selected sample by adding said product signals.

2. A method as claimed in claim 1, wherein said television signal comprises a color television signal sampled at three times the color subcarrier frequency, and said two adjacent samples having the same subcarrier phase and being to the right side of said selected sample comprise the third and sixth samples to the right side thereof, and said two adjacent samples having the same subcarrier phase and being to the left side of said selected sample comprise the third and sixth samples to the left side thereof, and said nearest left and right adjacent samples having the same subcarrier phase comprise said third samples to the left and right sides thereof respectively.

3. An apparatus for estimating a replacement sample for a selected sample of a sampled color television signal, said apparatus comprising first computing means for computing the amplitude difference between two adjacent samples having the same color subcarrier phase as the selected sample and being to the right side of the selected sample upon display, second computing means for computing the amplitude difference between two adjacent samples having the same color subcarrier phase as the selected sample and being to the left side of the selected sample upon display, third computing means for computing left and right weighting coefficients respectively comprising the right and left differences divided by the sum of said left and right differences, means for multiplying said left and right coefficients by said nearest left and right adjacent samples respectively having the same subcarrier phase as the selected sample thereby resulting in two product signals, and means for adding said product signals to form an estimated replacement sample for the selected sample.

4. An apparatus as claimed in claim 3, wherein said television signal comprises a color television signal sampled at three times the color subcarrier frequency, and said two adjacent samples having the same subcarrier phase and being to the right side of said selected sample comprises the third and sixth samples to the right side thereof, and said two adjacent samples having the same subcarrier phase and being to the left side of said selected sample comprise the third and sixth samples to the left side thereof, and said nearest left and right adjacent samples having the same subcarrier phase comprise said third samples to the left and right sides thereof respectively.

5. An apparatus as claimed in claim 4, wherein said first and second computing means each comprises a delay line, a subtractor having inputs coupled to said delay line, and an absolute value circuit coupled to said subtractor.

6. An apparatus as claimed in claim 5, wherein said delay lines have a delay of three sample intervals.

7. An apparatus as claimed in claim 4, wherein said third computing means comprises means for adding said differences, means for providing the reciprocal of the added differences, means for multiplying one of said differences by said reciprocal to supply one of said weighting coefficients, and means for providing one minus said one weighting coefficient thereby generating the remaining weighting coefficient.

8. An apparatus as claimed in claim 7, wherein each of said providing means comprises a read only memory.

* * * * *

UNITED STATES PATENT AND TRADEMARK OFFICE
CERTIFICATE OF CORRECTION

PATENT NO. : 4,377,820

DATED : March 22, 1983

INVENTOR(S) : Glenn Arthur Reitmeier

It is certified that error appears in the above-identified patent and that said Letters Patent is hereby corrected as shown below:

Col. 1, line 40 after "$\hat{f}n = 1/2\ p(n-3)$" insert $-- + 1/2\ p(n+3) --$

Col. 2, line 53, first occurence of "$p(n+6)$" should be $-- p(n+3) --$

Col. 3, line 55 "f" should be $-- \hat{f} --$

*Signed and Sealed this*

*Seventeenth* Day of *April 1984*

[SEAL]

*Attest:*

GERALD J. MOSSINGHOFF

*Attesting Officer*     *Commissioner of Patents and Trademarks*